United States Patent Office 3,383,386
Patented May 14, 1968

3,383,386
PROCESS FOR MAKING ALKALI METAL
QUATERNARY AMMONIUM SILICATES
Helmut Hans Wilhelm Weldes, Havertown, Pa., assignor to Philadelphia Quartz Company, Philadelphia, Pa., a corporation of Pennsylvania
No Drawing. Original application Aug. 22, 1960, Ser. No. 50,877, now Patent No. 3,239,549, dated Mar. 8, 1966. Divided and this application Oct. 21, 1965, Ser. No. 500,328
6 Claims. (Cl. 260—247.7)

INTRODUCTION

This application is a division of my application Ser. No. 50,877, filed Aug. 22, 1960, now Patent No. 3,239,549.

This invention generally relates to alkali metal quaternary ammonium silicates and methods for producing same. More specifically, this invention relates to alkali metal tetraalkanolammonium silicates, either in the form of crystalline compounds or solutions.

THE INVENTION

This invention broadly relates to the production of crystalline quaternary nitrogen compounds having the general formula:

$$M_2O \cdot X(N_nR_p{}^s)_2O \cdot YSiO_2 \cdot ZH_2O$$

In the above formula:

M preferably represents an alkali metal and most preferably sodium or potassium or mixtures thereof;

N represents a nitrogen atom;

n indicates the number of nitrogen atoms and is a small integer, less than 10 and preferably less than five;

X, Y and Z represent numbers defining the relative amounts of each of the component parts of the comound. X is preferably between 0.5 and 1.5, Y is preferably between 2 and 10, and Z is preferably between 1 and 40, and wherein up to four R groups are associated with each N;

R represents an organic radical that forms an NR base selected from the group consisting of alkylamines, alkanolamines, heterocyclic amines and cyclic amines which produce solutions with a pH of at least 9;

p is equal to the number of R groups and is at least 4 and up to 4n;

s is an integer from 1 to p, indicating number of different types of R groups.

According to one specific embodiment the invention relates to the production of compounds having the formula:

$$M_2O \cdot X(NR^1R^2R^3R^4)_2O \cdot YSiO_2 \cdot ZH_2O$$

wherein M, N, X, Y and Z have the significances noted above and $R^1$, $R^2$, $R^3$ and $R^4$ represent alkyl radicals containing between about 1 and 20 carbon atoms. Here p is 4 and s is 4 but may be any number from 1 to 4 inclusive.

In general, it can be said that the compounds of this invention are derived from nitrogen bases with a dissociation constant greater than that of $NH_3$ ($K=1.8\times10^{-5}$; $pK=4.74$) and/or nitrogen bases which produce solutions with a pH of at least 9.

The compounds of this invention can be formed in a number of ways. One preferred method is to react a quaternary ammonium hydroxide with an alkali metal silicate. Examples of suitable quaternary ammonium hydroxides would include tetraethanolammonium hydroxide, tetramethylammonium hydroxide, tetraethylammonium hydroxide, 2 tetrahydroxy ethyl piperazinium hydroxide, N,N' - bis-beta-hydroxyethyl morpholinium hydroxide, N,N,N' - tris - (beta - hydroxyethyl)-N'-[tris-(beta - hydroxyethyl)-ethylammonium]-piperazinium hydroxide.

The products of the reaction with an individual tetraalkanolammonium hydroxide have been shown to be substantially independent of the $SiO_2/Na_2O$ ratio of the soluble silicate used in the preparation. For instance, in the reaction between sodium silicate solutions and tetraethanolammonium hydroxide, crystals were prepared using sodium silicate solutions varying in percent by weight ratio of $SiO_2/Na_2O$ from 2.0 to 3.75. The final product varied in mol ratio over the following range:

$1.0Na_2O:1.0–1.5N^+(C_2H_4OH)_4:3.0–3.8SiO_2:$
$7.9–14.4H_2O(1Na_2O):0.5–0.75(N(C_2H_4OH)_4)_2O:$
$3.0–3.8SiO_2:7.9–14.4H_2O)$

In some of these starting mixtures, potassium silicate was added to the sodium silicate without any essential change in the final product except that the alkali metal present was a mixture of sodium and potassium.

The reaction temperature has been varied from 25° C. to 150° C. but satisfactory products generally were not obtained at temperatures above about 100° C. Reaction time has been varied from 2 to 20 hours with some tendency for a lower ratio of the quaternary ion in the final product at the longer time limit.

In the preparation of alkali metal tetraalkanolammonium silicates, the following general rules are found to be important.

(1) The amount of alkali metal silicate should not be too high in the reaction mixtures. If it is increased above a reasonable upper limit, there is danger of gel formation and crystallization is slow. The isolation of the crystals becomes difficult because of the high viscosity of the mother liquor.

(2) The amount of water distilled off from the final reaction mixture is quite critical.

(3) The reaction temperature should be as low as possible, preferably room temperature or possibly lower. However, at temperatures much below room temperature, reaction time becomes unreasonably long.

(4) Small amounts of potassium salts increase the speed of crystallization considerably.

(5) The final solution supersaturates readily and therefore should be seeded and mechanical aids used for faster crystallization.

The ratio of silica to the combined alkali in the precipitated product can be increased by adding finely divided hydrated silica to the mixture. By this means the ratio of the $SiO_2$ in the precipitate has been raised from about 3.3 up to 9 or even higher on the mol basis (i.e. 6.6 to $18SiO_2$:quaternary ammonium oxide). Mixtures of tetraethanolammonium hydroxide and alkali metal oxide in silicate solutions are also possible by these procedures: For instance, a solution formed by mixing S–35 sodium silicate with a solution of sodium tetraethanolammonium sicilate will have an SiO$_2$:Na$_2$O ratio higher than that of S–35.

It should be noted here too that it is intended to include the intermediate solutions as part of this invention. They are used not only as a source of the quaternary ammonium silicate crystals, but may themselves be used in many of the same applications that will be described later. It is of particular importance that they represent solutions with a very high ratio of silica to inorganic alkali and they may be concentrated to a rather high solids content. For instance, the following table shows Stormer viscosity in centipoises (cp.) at 20° C.

| Sodium Tetraethanol-Ammonium Silicate, percent by Weight | Solids Content, Percent by Weight | Cp. |
|---|---|---|
| 63 | 46.1 | 48 |
| 59 | 43.2 | 29 |
| 56 | 41.0 | 20 |
| 53 | 38.8 | 14 |

These aqueous solutions also readily dissolve finely divided silica, such as Baker's analyzed silicic acid, a hydrated Xerogel, or Quso (sold by Philadelphia Quartz Company), which is a hydrated precipitated silica, or Syloid-308 which is a finely divided silica gel sold by Davison Chemical Co., or Hi-Sil X-303 which is a hydrated precipitated silica sold by Columbia-Southern Chemical Co. These all may be dissolved in the above solutions at room temperature. (See Example 6.) It was found that silica from silica gel dissolved in my sodium quaternary ammonium silicates is in a completely crystalloidal state, whereas such silica dissolved in a normal sodium silicate, such as "N" silicate is in a completely colloidal state. The difference was demonstrated by the reaction with ammonium molybdate solution which with crystalloidal silica in my solution develops a yellow color whereas no color was found in the sodium silicate solution.

I have found that because of the high solubility of most of these quaternary ammonium alkali metal silicate compounds, the solutions need to be concentrated a great deal to induce crystallization. As indicated above, I have found that lower temperatures tend to promote the proper reaction and, in general, I propose to use temperatures below 100° C. and preferably about room temperature, although with some reactants, it is necessary to carry out the preliminary steps at a higher temperature and in an autoclave. The effects of these variables have been outlined in general terms above and become more apparent in the following examples. It is to be noted also that the alkali metal silicate has a catalytic effect on the crystallization of the product and mixed alkali silicates seem to be even more effective as seen by the addition of small amounts of potassium silicate to reactions involving sodium silicate primarily.

The concentration of alkali metal silicate is also of great importance. Where a high concentration is present, the speed of crystallization is greatly reduced. Thus, when sufficient sodium silicate is present to bring about complete reaction of the ammonium compound, crystallization is quite slow. On the other hand, if rapid crystallization is to be attained, the concentration of the sodium silicate may be only 50% of that necessary for the complete reaction with the quaternary ammonium ion. The presence of a small amount of potassium silicate is helpful with these sodium silicate solutions when the maximum yield is desired.

PROPERTIES OF TETRAETHANOLAMMONIUM SILICATE CRYSTALS

This crystalline compound has the approximate ratio of

1M$_2$O:1.4N+(C$_2$H$_4$OH)$_4$:3.8SiO$_2$:11H$_2$O(1M$_2$O:
0.7(N(C$_2$H$_4$OH)$_4$)$_2$O:3.8SiO$_2$:11H$_2$O)

It crystallizes from water in pseudo-cubic crystals which are either monoclinic or triclinic in crystal character. They are anisotropic and thus birefringent and they are either uniaxial or biaxial. Their refractive indices were found to be alpha=1.498, beta=1.506, and gamma =1.528.

The crystals have a density at 20°/20° of 1.604 and a melting point of 57–59° C. Softening begins at about 53° C. Solubility in water was found to be about 180 gms. in 100 ml. of water at 20° C. and 35.5 gms. in 100 ml. of water at 1.0° C. The crystals seem to be insoluble in all organic solvents. As indicated, the solubility rises rapidly as the temperature rises. Electrometric titration shows that this compound is a salt of a monobasic acid. It is either a double silicate salt or, if all the cationic groups can be combined as R$_2$O, the ratio appears to be 1R$_2$O:2.1–2.2SiO$_2$:7H$_2$O and the salt would be considered a disilicate. In the generalized formula $p$ equals 4, $s$ equals 1, $n$ equals 1.

A second crystalline product has the ratio of

1M$_2$O:0.6N+(C$_2$H$_4$OH)$_4$:3.3SiO$_2$:8H$_2$O(1M$_2$O:
0.3(N(C$_2$H$_4$OH)$_4$)$_2$O:3.3SiO$_2$:8H$_2$O)

It has a crystalline habit similar to the above-described silicate but a melting point at about 82–83° C. with softening beginning at 57° C. These crystals are also very soluble in water. When the cations are combined, the ratio appears to be 1R$_2$O:2.5SiO$_2$:6H$_2$O.

EXAMPLES

A number of the materials used in the following examples are described as follows:

The alkali metal silicates, supplied by the Philadelphia Quartz Co., are characterized in the following table:

| Trademark | Percent Ratio Na$_2$O:SiO$_2$ | Na$_2$O, percent | H$_2$O, percent |
|---|---|---|---|
| S 35 | 1:3.75 | 6.75 | 67.9 |
| N | 1:3.22 | 8.90 | 62.4 |
| E | 1:3.22 | 8.60 | 63.6 |
| K | 1:2.90 | 11.00 | 57.0 |
| RU | 1:2.40 | 13.85 | 53.0 |
| D | 1:2.00 | 14.70 | 55.8 |
| | (K$_2$O:SiO$_2$) | (K$_2$O) | |
| Kasil #1 | 1:2.50 | 8.30 | 70.5 |

Ammonium Hydroxide was the 28–30% aqueous Reagent Grade supplied by Allied Chemical Co.

Quso FF, a finely divided silica, also obtained as a trademarked product from the Philadelphia Quartz Company, has an ignited loss of 13.0%, with 7.2% of free water and 5.8% of bound water. It analyzed approximately 85% SiO$_2$, with a surface area of about 280 m.$^2$/g.

Another form of silica was Syloid-308 supplied by the trademark owner Davison Chemical Company. This silica had an ignited loss of 4.0 and contained approximately 95% SiO$_2$, with a surface area of about 230 m.$^2$/g.

A finely divided silica Hi-Sil X-303, supplied by the trademark owner Columbia-Southern Chemical Company, had an ignited loss of 8.5% and contained approximately 89.4% SiO$_2$, with a surface area of about 140 m.$^2$/g.

Tetraethanolammonium hydroxide was supplied by Carbide & Carbon Chemicals Company in 1945 as an aqueous solution containing 40% tetraethanolammonium hydroxide (1.96 N), 12.16% Na$_2$O and 0.29% CO$_2$ and by the R.S.A. Corporation of New York as a 40% methanolic solution.

Tetramethylammonium hydroxide was supplied by Eastman Kodak Co. as an aqueous 10% solution.

ANALYTICAL PROCEDURES

In analyzing the alkali quaternary ammonium silicates, special procedures are necessary.

Ignition loss.—The ignition loss is determined with a sample of quaternary silicate weighing one gram. This sample is heated in a covered platinum crucible, raising the temperature very, very slowly. If the ignition is carried out too fast, silicon carbide forms and it is almost impossible to burn it off. Therefore the crucible is heated extremely slowly on one side until all of the organic matter has charred completely. This procedure takes about one hour, then the heat is increased slowly to the full blast of a Tirrel burner and continued until the sample has turned completely to either white powder or a clear white melt. This takes about two more hours. When the sample is white in color it is transferred to a Fisher burner and heated full blast for a further half-hour.

Quaternary ammonium base.—The nitrogen content is determined using the Kjeldahl procedure with special modifications as indicated. About 0.75 gm. of the silicate is taken as a sample. This sample is weighed into a 500 ml. round-bottom, two-necked flask, and 10 grams of dehydrated $K_2SO_4$ and 2 grams of dehydrated $CuSO_4$ are added thereto. After admixing 12 ml. of concentrated $H_2SO_4$, a reflux glass tube is set on top of the flask and the mixture heated over a wire gauze in a hood slowly and cautiously, close to the boiling point of the sulfuric acid. Heating is continued until the originally dark solution becomes clear and no dark specks remain. This digestion period takes between 3 to 24 hours, depending on the composition. After the contents are cooled to room temperature, 100 ml. distilled water is added carefully through the reflux tube while swirling the contents. Then a few Alundum boiling stones are added and a magnetic stirrer. The reflux glass tube is removed and the flask is connected to the distillation equipment. The end of the condenser dips into a receiver containing 100 ml. of distilled water with excess 0.2 normal HCl over the expected equivalent of ammonia. About 130 ml. of 6-normal sodium hydroxide are added to the reaction flask through a dropping funnel while stirring with a magnetic stirrer. When all of the sodium hydroxide is added, the reaction mixture is heated for an hour to vigorous boiling. The ammonia formed during the digestion is driven over into the acid solution and after completion the free hydrochloric acid is back titrated with 0.2-normal NaOH.

Alkali metal determination.—The gravimetric sodium determination is not satisfactory. It is recommended that sodium be determined as the difference between the total titratable alkali of the sodium tetraethanolammonium silicate and its quaternary nitrogen content determined by the Kjeldahl method just described.

A one gram sample is dissolved in 50 ml. of water and titrated with 0.2-N HCl against a methyl orange indicator. This gives the total titratable alkali. The $Na_2O$ is then found by calculating the amount of 0.2-N HCl necessary for the quaternary present and subtracting this value from the total titratable alkali. The difference gives the amount of 0.2-N HCl used by $Na_2O$. Of course, if potassium is present, this has to be subtracted from the total alkali calculated as $Na_2O$.

With potassium, the usual gravimetric procedure employing the residue after the ignited loss and removal of $SiO_2$ with HF is satisfactory. (Vail, Soluble Silicates, vol. I, p. 41.)

Silica determination.—Silica in solution may be determined using the usual volumetric method and the gravimetric method may be used for insoluble silica. (Vail, Soluble Silicates, vol. I, p. 40.)

Example 1

1767.2 parts of aqueous 40% tetraethanolammonium hydroxide solution were mixed with 1067 parts of "E" brand sodium silicate. When these solutions were mixed together, no precipitate was formed. The mixture was cooled and held in an automatic electric refrigerator without a fan at a temperature of approximately 2° C. Crystals began to form in about one day and continued to grow in number and size for about six days. The crystals were then filtered off, washed with alcohol and ether and dried in vacuo (15–30 mm. Hg) at a temperature of 40° C. The yield was 777.1 parts of crystals. The mother liquor was then returned to the refrigerator and, during an additional two-week period, 152.2 parts more crystals formed. These were separated by filtration and the mother liquor was then mixed with ethanol until no further precipitation occurred. The precipitate was separated by filtering on a Buchner funnel and washed and dried, leaving 176.5 parts of crystalline material. This total yield of 1105.8 parts was almost theoretical inasmuch as 1110 parts should be obtained according to calculation. The product was purified by dissolving it in water to which ethanol was added in a ratio of about 150 ml. of water to 20 ml. of ethanol. The aqueous solution was again placed in the refrigerator and allowed to recrystallize and the crystals were separated out and washed with alcohol and ether and then dried in vacuo at room temperature. About 60% was recovered.

The product had the following composition by analysis:

| | Percent |
|---|---|
| Ignited loss | 64.79 |
| $N^+(C_2H_4OH)_4$ | 33.91 |
| $H_2O$ | 30.93 |
| $SiO_2$ | 27.33 |
| $Na_2O$ | 8.11 |

This analysis represents a compound having the following molar proportions:

$1Na_2O : 1.4N^+(C_2H_4OH)_4 : 3.8SiO_2 : 14.2H_2O$
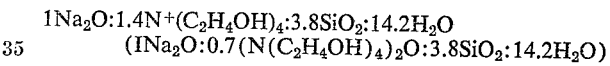

More dilute solutions than the 40% solution (1.9 molar) did not furnish crystals. For instance, 25.6 parts of the aqueous tetraethanolammonium hydroxide solution were mixed with 100 parts of distilled water, forming a 0.4 molar solution. To this was added a 0.4 molar solution of "E" sodium silicate solids (8.6 parts of "E" per 100 parts of $H_2O$). The final mixture was about 0.2 molar. No precipitation occurred even after storage for several days at a temperature of 2° C.

When one molar solutions were used, still no precipitation developed. Thus with tetraethanolammonium hydroxide solutions, near freezing solutions containing more than 11% tetraethanolammonium hydroxide and 3% "E" solids were required to initiate crystallization.

The following Table 1 shows the results of using sodium silicate solutions with a wide range of ratios. Attempts to prepare the tetraethanolammonium silicate using sodium metasilicate (ratio $1Na_2O : 1SiO_2$) solutions were not successful.

It should be mentioned in connection with the lower portion of this table (showing a mixture of potassium silicate with different amounts of "E" silicate) that in the presence of potassium oxide, crystallization seemed to occur more readily and the rate of crystallization was in direct proportion to the amount of the potassium silicate in the mixture. The higher the content of Kasil #1 the faster the crystallization proceeded. Necessarily if some potassium silicate is present there will be potassium silicate in the final crystals in proportion to the relative amount present but the triple salt is a disilicate in the general ratio of $1M_2O : 2SiO_2 : 4.5–5.5H_2O$ where $M_2O$ is $(Na_2O+K_2O)$ in any combination with a major proportion of tetraethanolammonium ion expressed as $R_2O$.

When 10% of the silica in the reaction mixture was present as Kasil #1 potassium silicate, crystals formed in large quantities in a few hours compared with three days with no potassium silicate present. This was true whether the reaction proceeded with tetraethanol ammonium hydroxide or was begun with more basic raw materials such as ethylene oxide in aqueous ammonia.

TABLE 1.—COMPOSITION OF ALKALI METAL TETRAETHANOLAMMONIUM SILICATES OBTAINED FROM DIFFERENT ALKALI METAL SILICATES AND TETRAETHANOLAMMONIUM HYDROXIDE

| Alkali Metal Silicate | Weight Percent Ratio $Na_2O:SiO_2$ | Reaction Product | | | | | Mole Ratio ($Na_2O+K_2O$)=1 |
|---|---|---|---|---|---|---|---|
| | | Analysis, percent | | | | | |
| | | $K_2O$ | $Na_2O$ | $N^+(C_2H_4OH)_4$ | $SiO_2$ | $H_2O$ | $(N(C_2H_4OH)_4)_2O:SiO_2:H_2O$ |
| D | 1:2.00 | | 8.38 | 32.96 | 28.09 | 30.19 | 0.65:3.5:12.4 |
| RU | 1:2.40 | | 10.23 | 31.96 | 29.59 | 27.29 | 0.50:3.0:9.2 |
| K | 1:2.90 | | 8.72 | 32.74 | 28.45 | 29.22 | 0.60:3.4:11.5 |
| E | 1:3.22 | | 8.11 | 33.91 | 27.33 | 30.93 | 0.70:3.8:14.2 |
| S 35 | 1:3.75 | | 7.41 | 33.91 | 27.33 | 30.93 | 0.75:3.8:14.4 |
| | $K_2O:SiO_2$ | | | | | | |
| Kasil #1 | 1:2.50 | 6.11 | 3.71 | 36.21 | 29.35 | 24.39 | 0.70:3.8:10.3 |
| Plus small amt. E | | 4.51 | 5.31 | 35.94 | 29.05 | 24.65 | 0.70:3.6:10.2 |
| Plus medium amt. E | | 3.14 | 6.62 | 36.02 | 29.44 | 24.47 | 0.65:3.5:9.7 |
| Plus larger amt. E | | 1.48 | 8.04 | 38.67 | 30.35 | 20.77 | 0.55:3.8:7.9 |

Example 2

A pure aqueous solution of tetraethanolammonium hydroxide was prepared by distilling off the methanol from a 40% methanolic solution (obtained from RSA Corporation) and dissolving the residue in water. In 200 parts of a 20% aqueous tetraethanolammonium hydroxide solution (prepared as described above) was dissolved 9 parts of NaOH. To this solution 30 parts of "Quso FF" were added and the mixture rotated on a ball mill for 36 hours at room temperature until most of the $SiO_2$ had dissolved. After centrifuging to separate undissolved material, 110 parts of water were distilled off in vacuo at 40° C. and the clear solution then refrigerated at 2° C. Crystals formed rather quickly and were filtered off after 2 days. They were washed with acetone and ether and dried in vacuo (15–30 mm. Hg; 40° C.) and were found to be similar to the ones obtained in Example 1.

Analysis: Percent
$SiO_2$ ---------------------------- 31.62
$N(C_2H_4OH)_4$ ------------------- 37.22
$Na_2O$ ---------------------------- 8.70
$H_2O$ ----------------------------- 21.89

Mole ratio: $1Na_2O:1.37N^+(C_2H_4OH)_4:3.76SiO_2:8.7H_2O(1Na_2O:0.69(N(C_2H_4OH)_4)_2O:3.76SiO_2:8.7H_2O)$.

Example 3

The solutions of sodium tetraethanolammonium silicate readily dissolve silicic acid in the form of hydrated silicas such as those already described.

For example, 50 parts sodium tetraethanolammonium silicate were dissolved in 50 parts of water forming a solution of 34.2% solids content. When 24 parts silicic acid of the Baker's analyzed type, for instance, were placed in the solution and revolved on a ball mill, most of the silica dissolved and the mixture set to a jelly-like material. 30 parts additional of water were added and ball-milling continued. After 5 additional hours the mixture was filtered and the solution was found to have a composition of 2.26% $Na_2O$, 9.71% quaternary ions, 19.27% $SiO_2$; the mol ratio was

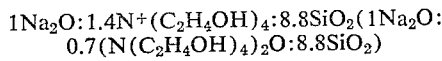

$1Na_2O:1.4N^+(C_2H_4OH)_4:8.8SiO_2(1Na_2O:0.7(N(C_2H_4OH)_4)_2O:8.8SiO_2)$

A similar solution was made up by dissolving completely 14 parts of the silicic acid. This had a mol ratio of $1Na_2O:1.4$ quaternary ion and $7SiO_2(1Na_2O:0.7$ quaternary ammonium oxide:$7SiO_2)$. The solution had a solids content of 40.34%.

A solution of 80 parts of sodium tetraethanolammonium silicate was dissolved in 50 parts of water containing 17.0% $SiO_2$ resulting in a ratio of $1Na_2O:1.4$ quaternary ion:$3.8SiO_2(1Na_2O:0.7$ quaternary oxide:$3.85SiO_2)$. Sufficient finely divided silicia was added to give a final ratio of $Na_2O:SiO_2$ of 1:4.2. After 5.5 hours on the ball mill at room temperature all of the Baker's silicic acid and the Quso had dissolved. When using Syloid-308 or Hi-Sil X-303 in place of Quso in other runs, it was necessary to continue a ball milling overnight. Each of these solutions was clear and found to have a ratio of $1Na_2O:1.4$ quaternary ion:$4.3SiO_2$ $(1Na_2O:0.7$ quaternary ammonium oxide:$4.3SiO_2)$.

The solutions were placed in a refrigerator for six days at 2° C. The well-crystallized precipitates were then isolated by filtration and washing with alcohol and ether and drying in vacuo as usual. The final product had a ratio of $1Na_2O:1.5$ quaternary ion:$4.2SiO_2:7.5H_2O$ $(1Na_2O:0.75$ quaternary ammonium oxide:$4.2SiO_2:7.5H_2O)$.

Similar reaction mixtures have been prepared and the product formed by spray drying the solution instead of allowing it to crystallize in a cake. In this way, the necessity of grinding the cake was avoided.

In one such case the amount of dilution water was sharply reduced to 60 parts in the formula given above. The preparation and crystallization of this mixture was carried out satisfactorily and the mass was spray dried using a ring type nozzle with six openings around the center, placed at the top of a 3 foot-2 inch conventional spray drier. (A fluid atomizing research type spray drier from the Swenson Corp. of Harvey, Illinois.) Best results were obtained with an air inlet temperature of 420–430° C. and an outlet temperature of 80–90° C. The atomizing air pressure was 75 p.s.i. and the slurry pressure was 50 p.s.i. 69 parts of product were obtained having the formula $1M_2O:1.3$ tetraethanolammonium ion:$3.9SiO_2:3.3H_2O(1M_2O:0.65$ tetraethanolammonium oxide:$3.9SiO_2:3.3H_2O)$. The lower water content is probably related to the higher melting point which was found to be 108° C. The product decomposed at 173° C.

Example 4

A high ratio solution was formed by first dissolving 50 parts of sodium tetraethanolammonium silicate of the normal type having a ratio of $1:1.5:4.0:13:3(1Na_2O:0.75$ quaternary ammonium oxide:$4.0SiO_2:13.3H_2O)$ in 50 parts water. This dissolved completely. Then 20.7 parts of finely divided silica (Quso) were added and mixed on the ball mill for 36 hours at room temperature. A small amount of undissolved residue was centrifuged off and the solution was concentrated to a viscosity of about 2 poises by removing the water in vacuo at 40° C.

The final solution had a mol ratio of $1Na_2O:1.5N^+(C_2H_4OH)_4:8.8SiO_2(1Na_2O:0.75$ quaternary ammonium oxide:$8.8SiO_2)$ and contained 67.1% $H_2O$. The Stormer viscosity at 20° C. was 62.7 sec.

There are a number of possibilities of forming solutions with even higher proportions of silica to inorganic alkali. Solutions entirely free of sodium or potassium or other inorganic alkali may also be prepared. It is obvious, for instance, that using the proper base exchange resins, sodium and potassium may be removed from the solution of the tetraethanolammonium silicate leaving the alkali-free tetraethanolammonium silicate.

Another means of forming a sodium-free organic alkali silicate is to minimize the soluble alkali metal silicate present and increase the amount of silica present through the solution of silica gel or from other forms of silica soluble in the organic alkali.

It is also advantageous at times to increase the ratio of $SiO_2$ to $M_2O$ where M stands for inorganic alkali metal by mixing solutions of the soluble silicates with those of the quaternary ammonium silicates such as sodium tetraethanolammonium silicate. Where the organic silicate has a ratio of 8 or more $SiO_2$ to one of $Na_2O$, the ratio in solution can be increased considerably over that of the ordinary soluble silicate solution.

Example 5

A double salt of sodium and tetramethylammonium silicate was prepared using a technique very similar to the one described in Example 1. 20.6 parts of "E" silicate were run into 27.7 parts of an agitated 10% aqueous tetramethylammonium hydroxide solution at room temperature. The resulting clear solution was concentrated in vacuo at 40° C. After 15.2 parts of $H_2O$ were distilled off, the clear residual solution was refrigerated at 2° C. overnight. A lot of crystals had formed which were filtered on a Buchner funnel, washed twice with acetone and ether, and dried in vacuo at 40° C.

The yield was 4.6 parts. The crystals had a mol ratio of $Na_2O:N^+(CH_3)_4:SiO_2:H_2O::1:4.6:6.6:31.7$
$(Na_2O:(N(CH_3)_4)_2O:SiO_2H_2O::1:2.3:6.6:31.7)$ They are birefringent and seem to have a strong cleavage in one direction. The refractive indices were determined to be alpha=less than 1.450, beta=less than 1.460, gamma=1.466. The material softens at 145–147° C. and melts sharply at 158–159° C. It is very soluble in water and insoluble in acetone, ether or methanol, and decomposed by ethanol.

If the quaternary is expressed as $R_2O$ and the mol ratio for $Na_2O+R_2O=M_2O$ is calculated, then $M_2O:SiO_2:H_2O = 1:1.995:9.00$, showing that this material is a disilicate as are all the others.

UTILITY

The reactions of these crystals indicate their useful applications. For instance, dry mixtures of an isolated, undenatured soy protein known as Buckeye Protein and sold by the Buckeye Cotton Oil Co., Memphis, Tennessee, are easily prepared by mechanical mixing with the sodium tetraethanolammonium silicate of my invention. Such dry solid mixtures were stable in closed tubes for over 7 months. The mixtures are almost immediately soluble in water and when dissolved in water at the right concentrations, they perform very well as adhesives for laminating paperboard. A specific example is a dry mixture of 29 lbs. of Buckeye Protein and 32 lbs. of sodium tetraethanolammonium silicate having a composition of $1M_2O:1.4N^+(C_2H_4OH)_4:3.8SiO_2:11H_2O$ ($1M_2O:0.7$ quaternary ammonium oxide:$3.8SiO_2:11H_2O$) dissolved in 278 lbs. of water. The silicate dissolved instantly at room temperature forming a dispersion of the protein having a pH of 11.2 after one hour and 11.0 after six days. The viscosity at 1 hour was 14 cp. and 8 cp. after six days. Neither the odor nor the appearance changed in three weeks. This adhesive mixture has, therefore, a number of advantages over the ordinary sodium silicate-soy-protein adhesive composition in which an odor is likely to be developed in a few days and the viscosity is likely to deteriorate badly in one or two days. Cold-set and heat-set bond samples were prepared using corrugated paperboard with the following results:

| Properties | Cold Set Lbs./12" flute line | Heat Set Lbs./12" flute line |
|---|---|---|
| Dry Strength | 63.0 | 58.6 |
| ½ Hr. Wet Strength | 4.4 | 5.2 |
| 24-Hr. Wet Strength | 7.2 | 8.2 |
| 24-Hr. Soaking & Redry | 58.9 | 53.6 |

It is to be noted that the redried strengths are equivalent to those which are obtained with a normal silicate undenatured protein adhesive. This mixture has advantages over the ordinary silicate mixture in that it is a dry combination which is readily dispersed to an adhesive at a higher dilution than the normal adhesive and with a working life measured in weeks rather than hours.

The reaction of alkali on the Buckeye Protein was studied by determination of free amino groups as a function of aging using the Van Slyke determination of nitrogen. With caustic soda (NaOH) the number of available amino groups increases very rapidly with time and levels off after about 8 days. The mixture still smells strongly of ammonia. With the "N" sodium silicate solution sold by the Philadelphia Quartz Company having a specific gravity of 41° Baumé and a weight percent ratio of 1 $Na_2O:3.22\ SiO_2$, the determinable amino groups decrease slightly in the first few days and then increase steadily although the rate of increase is much less than the rate with free caustic. Thus the sodium silicate has some stabilizing effect on the protein and the mixture does not have much of an ammoniacal odor. With the sodium tetraethanolammonium silicate, however, the increase in free amino groups is very low and practically constant over a period of 8 days and no change in odor develops. Thus the organic silicate has an even better stabilizing effect than does the sodium silicate, although the pH is practically the same for all three mixtures.

A thick adhesive mixture of Buckeye protein and water was prepared and samples were retained with dosages of 50 p.p.m. to 2000 p.p.m. of sodium tetraethanolammonium silicate. These samples were all seeded with spoiled protein solution in order to speed up the formation of odor. However, none of the samples developed such an odor during nine days of storage. This does not necessarily indicate that my sodium tetraethanolammonium silicate is either a bactericide or has bacteristatic action. I believe that the tetraethanolammonium silicate stabilizes the protein in such a condition that it cannot be acted upon by the bacteria present.

The quaternary ammonium sodium silicates are also useful as setting agents for refractories which are quite resistant to boiling water.

My quaternary ammonium alkali silicates can also be used in detergent mixtures with polyphosphates such as tetrapotassium pyrophosphate forming a liquid detergent. Mixtures were prepared using a 45% solution of $K_4P_2O_7$ obtained from Westvaco Chemical Co. The order of mixing is usually sodium tetraethanolammonium silicate, then water, and finally a tetrapotassium pyrophosphate. However, it was demonstrated that the phosphate and the organic silicate could be reversed in this mixing procedure. These compounds were compatible over a range of 5 to 25% of the organic silicate and 40 to 5% $K_4P_2O_7$.

Solutions of the sodium tetraethanolammonium silicates have gel time characteristics similar to the ordinary sodium silicate solutions. They may thus be used to form coagulant aids in the coagulation of raw waters with such materials as alum, etc.

These sodium tetraethanolammonium silicates have specific gravity, viscosity and pH characteristics quite similar to those of the alkali metal silicates. The following table gives some representative data:

|  | A | B | C | N[1] |
|---|---|---|---|---|
| Percent $Na_2O+K_2O$ (as $Na_2O$) | 2.31 | 1.98 | 2.85 | 8.90 |
| Percent $N^+(C_2H_4OH)_4$ | 10.83 | 11.30 | 7.94 |  |
| Percent $SiO_2$ | 19.77 | 17.88 | 20.63 | 28.70 |
| Specific gravity | 1.191 | 1.224 | 1.394 |  |
| Viscosity (c.p. at 20° C.) | 215 | 59 | 9.4 | 180 |
| pH |  | 11.0 |  | 11.3 |
| Clarity | (2) | (2) | (3) | (2) |

[1] N sodium silicate.
[2] Clear.
[3] Opalescent.

The sodium tetraethanolammonium silicates in this table were all high ratio products. Sample A was made using Quso FF. The organic silicate was crystallized and separated from the final solution.

Sample B was prepared in the normal way using Baker's Analyzed Silica to increase the silica content.

Sample C was prepared using a colloidal silicate solution, Ludox LS from Du Pont de Nemours, Inc., as the source of extra silica. In this product about half of the final silica was colloidal rather than crystalloidal, as in the Samples A and B, although immediately after the reaction occurred 63% of the silica was crystalloidal.

In solutions with much higher total solids content my sodium tetraethanolammonium silicate may form solutions which are quite viscous. For instance, one containing 45% solids with 19.4% SiO₂ reached a viscosity of 2,850 cp. at 20° C. and a specific gravity of 1.309.

When freshly polished nails are allowed to stand in pure distilled water, large amounts of rust form in a few days. However, if 1% of the sodium tetraethanolammonium silicate is added to distilled water, a polished nail will not be attacked for a period of six months or more. It is to be expected that these organic silicates would likewise be useful in boiler water, ore flotation, tanning, dyeing, printing, coatings, textile assistance, fungicides, bactericides, coagulation aids, etc.

What is claimed is:

1. A method of preparing compounds having the formula:

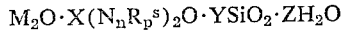

$$M_2O \cdot X(N_nR_p{}^s)_2O \cdot YSiO_2 \cdot ZH_2O$$

wherein:
M represents at least one alkali metal;
X is between about 0.5 and 1.5;
n indicates the number of nitrogen atoms and is a small integer less than 10;
R represents an organic radical that forms an NR base selected from the group consisting of alkylamines, alkanolamines, heterocyclic amines and cyclic amines which produce solutions with a pH of at least 9;
p is equal to the number of R groups and is at least 4 and up to 4n;
s is an integer from 1 to p indicating the number of different types of R groups;
Y is between 2 and 10;
Z is between 1 and 40;
which comprises reacting a quaternary ammonium hydroxide having a pH of at least 9 with an alkali metal silicate, crystallizing and recovering the crystallized product.

2. The method according to claim 1 wherein the said hydroxide is tetraethanolammonium hydroxide.

3. The method according to claim 1 wherein said hydroxide is tetramethylammonium hydroxide.

4. The method according to claim 1 wherein said hydroxide is 2 - tetra - beta - hydroxyethyl piperazinium hydroxide.

5. The method according to claim 1 wherein said hydroxide is N,N'-bis-beta-hydroxyethyl morpholinium hydroxide.

6. The method according to claim 1 wherein the quaternary ammonium hydroxide has a pH of at least 9 and a dissociation constant greater than NH₃.

References Cited

UNITED STATES PATENTS

| 2,137,314 | 11/1938 | Ulrich et al. | 260—567.6 |
| 2,689,245 | 9/1954 | Merrill | 260—247 |

FOREIGN PATENTS 709,634  6/1954  Great Britain.

NICHOLAS S. RIZZO, *Primary Examiner.*

HENRY R. JILES, ALEX MAZEL, JOSE TOVAR, *Examiners.*